April 19, 1938. H. C. EDWARDS 2,114,977
FUEL INJECTOR
Filed May 13, 1937
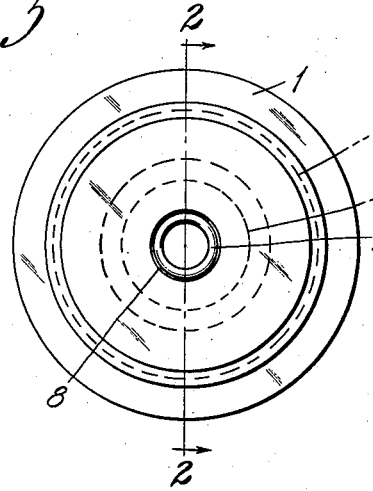
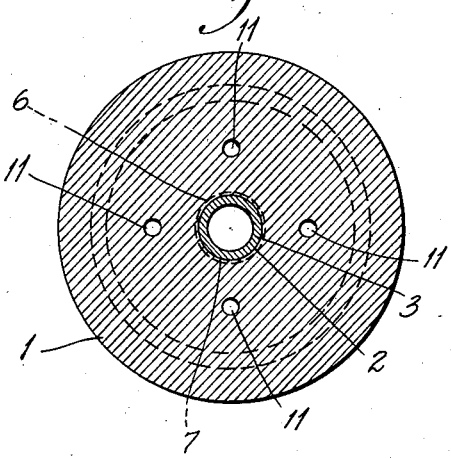
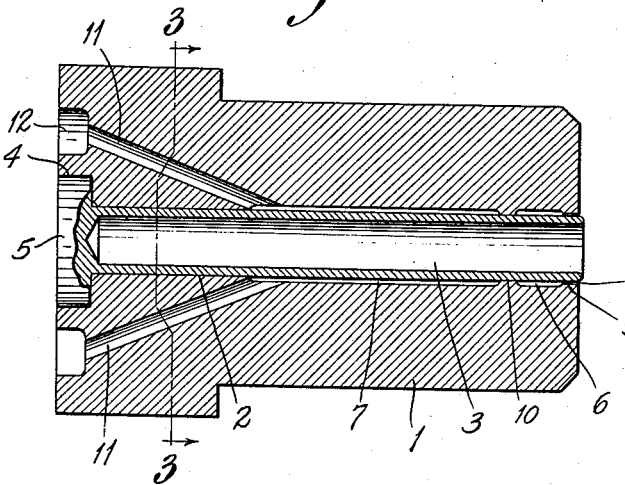
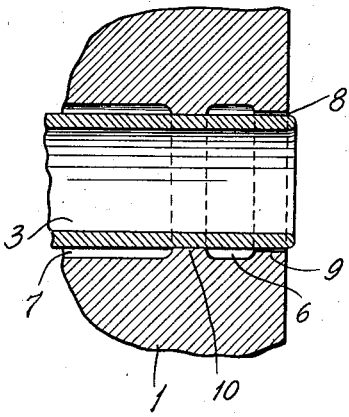
INVENTOR:
Herbert C. Edwards,
by Carr Plan & Gravely,
HIS ATTORNEYS Patented Apr. 19, 1938

2,114,977

UNITED STATES PATENT OFFICE 2,114,977

FUEL INJECTOR

Herbert C. Edwards, Massillon, Ohio, assignor to The Timken Roller Bearing Company, Canton, Ohio, a corporation of Ohio Application May 13, 1937, Serial No. 142,406

3 Claims. (Cl. 299—107.3)

This invention relates to fuel injectors, particularly hydraulically operated fuel injectors for compression-ignition oil engines. It has for its principal objects to provide for simplicity and cheapness of construction of such devices, to facilitate assembly and disassembly of the parts, and to obtain other advantages hereinafter appearing. The invention consists in the fuel injector and in the construction, combinations and arragements of parts hereinafter described and claimed.

In the accompanying drawing, which forms part of this specification and wherein like symbols refer to like parts wherever they occur, Fig. 1 is a view of the outer or discharge end of a fuel injector embodying my invention, Fig. 2 is a central longitudinal section on the line 2—2 in Fig. 1, Fig. 3 is a cross-section on the line 3—3 in Fig. 2; and Fig. 4 is an enlarged central longitudinal section of the discharge end portion of the injector.

The pressure operated fuel injector illustrated in the accompanying drawing comprises a cylindrical nozzle member or portion 1 having a cylindrical bore 2 extending axially therethrough from end to end thereof. Mounted in the bore 2 of the nozzle is a valve member in the form of a thin-walled cylindrical tube 3 that preferably extends from end to end of said bore. Said bore is provided at the inner end of the nozzle with a flat-bottomed enlargement or counterbore 4; and the tubular valve member is formed at said end of said nozzle with an enlarged cylindrical head portion 5 that seats within said counterbore.

The valve receiving bore 2 of the nozzle 1 is enlarged intermediate between its ends to form two longitudinally spaced annular chambers 6 and 7, respectively, around the hollow cylindrical valve member 3. The chamber 6 is a relatively short chamber that is located adjacent to the discharge end of the nozzle and opens into an annular discharge orifice 8 formed by an accurately determined clearance space between the valve member and an internal annular rib or land 9. The chamber 7 is a relatively long chamber that is normally separated from the relatively short chamber 6 by an internal annular rib or land 10 and is supplied with fuel by one or more passageways 11 that lead from an annular groove 12 in the inner or inlet end of said nozzle and open into the chamber 7 at the inner end thereof. The valve member 3 has a light press-fit in the innermost annular rib 10 of the bore and in the portion thereof located inwardly of the annular chamber 7.

By the arrangement described, when sufficient pressure is exerted by the injection pump or other device (not shown) on the oil in the annular chamber 7, which surrounds the tubular valve 3, such pressure operates to compress said tube so that the wall thereof will move inwardly away from the annular rib 10 and thus open up an annular passageway to the annular chamber 6, from which the oil escapes through the annular discharge orifice 8 at the discharge end of the nozzle. When the pressure is relieved, the tubular valve expands against the rib 10, thus shutting off the flow of fuel through the nozzle. The shape of the rib 9 or the radiused or beveled outer end of the valve member may be changed to obtain the desired spray characteristics. The pressure at which the nozzle will open may be determined by the wall thickness of the tubular valve member and by the tightness of its fit in the annular rib 10. The pressure which compresses the tubular valve also tends to expand the nozzle body; but said body is preferably made heavy enough to resist such expansion.

The above valve construction is simple and economical to manufacture; it can be readily assembled and disassembled; and it dispenses with the more expensive spring-loaded plunger type valves heretofore used with hydraulically operated fuel injectors.

What I claim is:

1. A fuel injector comprising a nozzle member having a cylindrical bore therein and a cylindrical tubular member mounted in said bore, said members cooperating to form therebetween a continuously open annular discharge orifice at the outer ends thereof and an annular pressure space located inwardly of said annular discharge orifice and separated therefrom by an annular land on one of said members that has a normally fluid-tight surface contact with the cylindrical surface of the other of said members that permits relative endwise expansion and contraction thereof with changes of temperature, said annular pressure space being adapted to be supplied with fluid under pressure sufficient to cause relative radial movement of said annular land and the portion of the member having surface contact therewith and thereby permit the fuel to pass therebetween.

2. A fuel injector comprising a nozzle member having a cylindrical bore therein and a cylindrical tubular member mounted in said bore, said members cooperating to form a continuously open annular discharge orifice at the outer ends thereof and an annular pressure space located inwardly of said annular discharge orifice, said bore having an annular land therein that has a normally fluid-tight surface contact with the outer periphery of said tubular member so as to normally cut off communication between said annular pressure space and said annular discharge orifice while permitting endwise expansion and contraction of said tubular member relative to said annular land, said annular pressure space being adapted to be supplied with fluid under pressure sufficient to compress said tubular member radially and thereby permit passage of the fuel between said tubular member and said annular land.

3. A fuel injector comprising a nozzle having a cylindrical bore therein and a cylindrical tube mounted in said bore and cooperating therewith to form an annular pressure chamber therebetween, said bore having two axially spaced annular lands therein, the outermost land being spaced from said tube to form therewith a continuously open annular discharge orifice and the innermost annular land having a surface contact with the outer periphery of said tube that normally cuts off communication between said annular pressure space and said annular discharge orifice while permitting said tube to elongate and contract endwise with changes of temperature, said annular pressure space being adapted to be supplied with fluid under pressure sufficient to compress said tube radially and thereby permit passage of the fuel between said valve member and said innermost annular rib.

HERBERT C. EDWARDS.